United States Patent [19]

Aramaki

[11] Patent Number: 5,580,328
[45] Date of Patent: Dec. 3, 1996

[54] TOROIDAL-TYPE CONTINUOUSLY VARIABLE TRANSMISSION

[75] Inventor: Hirotoshi Aramaki, Odawara, Japan

[73] Assignee: NSK Ltd., Tokyo, Japan

[21] Appl. No.: 389,801

[22] Filed: Feb. 16, 1995

[30] Foreign Application Priority Data

Mar. 2, 1994 [JP] Japan .................. 6-032334

[51] Int. Cl.$^6$ .................................................. F16H 15/38
[52] U.S. Cl. ............................................. 476/40; 384/564
[58] Field of Search .......................... 476/39, 40; 384/564

[56] References Cited

U.S. PATENT DOCUMENTS

| | | | |
|---|---|---|---|
| 1,630,339 | 5/1927 | Ganster | 384/564 |
| 3,004,808 | 10/1961 | Powers | 384/564 |
| 4,444,068 | 4/1984 | Kraus | 74/200 |
| 4,453,427 | 6/1984 | Kraus et al. | 476/40 |
| 4,909,092 | 3/1990 | Machida et al. | 74/200 |
| 5,009,523 | 4/1991 | Folger et al. | 384/564 |
| 5,048,359 | 9/1991 | Nakano | 476/40 |
| 5,267,920 | 12/1993 | Hibi | 476/40 |

FOREIGN PATENT DOCUMENTS

| | | |
|---|---|---|
| 58-128555 | 8/1983 | Japan . |
| 62-71465 | 5/1987 | Japan . |
| 62-199557 | 12/1987 | Japan . |
| 5-71515 | 9/1993 | Japan . |

*Primary Examiner*—Charles A. Marmor
*Assistant Examiner*—David Fenstermacher
*Attorney, Agent, or Firm*—Shapiro and Shapiro

[57] ABSTRACT

Each of the power rollers incorporated in a toroidal-type continuously variable transmission is arranged to prevent damage such as cracks, from being created thereon when the transmission is in operation. The inner circumferential surface of each power roller is configured continuously with a smaller diametral section close to the outer edge surface, a larger diametral section on its opposite side, and a stepping portion connecting them. A needle bearing for supporting the power roller on a displacement shaft is provided inside the larger diametral section. Due to the portion of the smaller diametral section thus provided, the stress capacity is increased with respect to the tensile stresses exerted at the time of operation; thus preventing damage such as cracks, from being easily created.

1 Claim, 4 Drawing Sheets

TOROIDAL-TYPE CONTINUOUSLY VARIABLE TRANSMISSION

BACKGROUND OF THE INVENTION

1. Field of the Invention

The present invention relates to a toroidal-type continuously variable transmission. More particularly, the invention relates to a toroidal-type continuously variable transmission used for a speed change gear for an autovehicle, for example.

2. Related Background Art

The use of a toroidal-type continuously variable transmission which is schematically shown in FIG. 2 and FIG. 3 is under study as a speed change gear for an autovehicle. This toroidal-type continuously variable transmission is such that a disc 2 on the input side is supported coaxially with an input shaft 1, and a disc 4 on the output side is fixed to the end portion of an output shaft 3 coaxially arranged with the input shaft 1, as disclosed in the specification of Japanese Utility Model Laid-Open Application No. 62-71465, for example. In the inner side of the casing where the toroidal-type continuously variable transmission is housed, trunnions 6 and 6 are arranged swingably, centering on the pivots 5 and 5 provided for the torsional positions with respect to the input shaft 1 and output shaft 3.

The trunnions 6 and 6 are provided with the pivots 5 and 5 on the outer faces of both ends, and also, in the central portions of the trunnions 6 and 6, the base ends of the displacement shafts 7 and 7 are supported, respectively. The trunnions 6 and 6 are allowed to swing around the pivots 5 and 5 to make it possible to freely adjust each inclined angle of the displacement shafts 7 and 7. Around the displacement shafts 7 and 7 supported by the trunnions 6 and 6, power rollers 8 and 8 are rotatively supported, respectively. Each of the power rollers 8 and 8 is pinched between the discs 2 and 4 on the input and output sides.

The inner side faces 2a and 4a, where the discs 2 and 4 on the input and output sides face each other, have concave cross-sections, each being obtainable by following a respective circle centered on the aforesaid pivot 5. Hence the spherically convex circumferential surfaces 8a and 8a of the power rollers 8 and 8 are allowed to be in contact with the inner side faces 2a and 4a, respectively.

Also, between the outer end faces 8b, 8b of each of the power rollers 8, 8 and the inner side faces 6a, 6a of each of the trunnions 6, 6, thrust rolling bearings 9, 9 are provided, respectively. The thrust rolling bearings 9, 9 are to support the thrust loads exerted on each of the power rollers 8, 8 when the toroidal-type continuously variable transmission is in operation. Each of the thrust rolling bearings 9 and 9 comprises, as shown in FIG. 4 to be described later, the inner ring raceway 10 which is formed on each of the outer end faces 8b, 8b, and the outer ring raceway 11 which is formed on the inner side face of each of the outer rings 39, 39 provided along the inner side faces 6a, 6a; a plurality of rolling elements (balls) 12, 12 which are in contact with each of the raceways 10 and 11; and a cage 13 which rotatively holds the plurality of rolling elements 12, 12. Also, between the outer circumferential surface of each leading end of the displacement shafts 7, 7 and the inner circumferential surface of each of the power rollers 8, 8, a needle bearing 34 is provided as shown in FIG. 4 which will also be described later.

Further, between the aforesaid input shaft 1 and the disc 2 on the input side, a pressing device 14 of a loading cam type is arranged. By this pressing device 14, the disc 2 on the input side is pressed elastically toward the disc 4 on the output side. The pressing device 14 is structured by a cam board 10 which rotates together with the input shaft 1, and a plurality of rollers 17 and 17 supported by a cage 16. On one side face (on the left side face in FIG. 2 and FIG. 3) of a cam board 15, a circumferentially concave and convex cam surface 18 is formed. Likewise, on the outer surface (on the right side face in FIG. 2 and FIG. 3) of the disc 2 on the input side, a cam surface 19 is formed, hence rotatively supporting the plurality of rollers 17 and 17 so that they are radially spaced about an axis extending along the center of the input shaft 1.

When using the toroidal-type continuously variable transmission structured as described above, the plurality of rollers 17 and 17 are pressed toward the cam surface 19 on the outer side face of the disc 2 on the input side by the function of the cam surface 18 along the rotation of the cam board 15 following the rotation of the input shaft 1. As a result, at the same time that the disc 2 on the input side is pressed toward the aforesaid plural power rollers 8 and 8, the disc 2 on the input side is allowed to rotate when the pair of cam surfaces 18 and 19 engage with the plural rollers 17 and 17. Then the rotation of the disc 2 on the input side is transmitted to the disc 4 on the output side through the plural power rollers 8 and 8 to rotate the output shaft 3 which is fixed to the disc 4 on the output side.

In a case where the rotational speed of the input shaft 1 and output shaft 3 should be changed, and in particular when speed reduction is performed between the input shaft 1 and output shaft 3, the trunnions 6 and 6 are caused to swing around the pivots 5 and 5 to incline the displacement shafts 7 and 7, respectively, so that, as shown in FIG. 2, the circumferential surfaces 8a and 8a of the power rollers 8 and 8 can abut the portion close to the center of the inner side face 2a of the disc 2 on the input side, and the portion close to the outer circumference of the inner side face 4a of the disc 4 on the output side, respectively.

On the contrary, in order to accelerate, the trunnions 6 and 6 are caused to swing to incline the displacement shafts 7 and 7, respectively, so that, as shown in FIG. 3, the circumferential surfaces 8a and 8a of the power rollers 8 and 8 can abut the portion close to the outer circumference of the inner side face 2a of the disc 2 on the input side and the portion close to the center of the inner side face 4a of the disc 4 on the output side, respectively. If each of the displacement shafts 7 and 7 is set at an intermediately inclined angle between those shown in FIG. 2 and FIG. 3, an intermediate reduction ratio can be obtained between the input shaft 1 and output shaft 3.

Further, FIG. 4 is a view which shows a toroidal-type continuously variable transmission in a more specific form represented on a microfilm of Japanese Utility Model Application No. 61-87523 (Japanese Utility Model Laid-Open Application No. 62-199557) as a speed change gear for an autovehicle. The rotation of an engine crank shaft is transmitted to an input shaft 20 through a clutch 38 to rotate a cam board 15 which is arranged to engage with the intermediate section of the input shaft 20 by means of splines. Then, by the function of a pressing device 14 structured to include this cam board 15, the disc 2 on the input side is allowed to rotate while being pressed toward the disc 4 on the output side, that is, to the left-hand side in FIG. 4. The rotation of the disc 2 on the input side is transmitted to the disc 4 on the output side by means of the power rollers 8 and 8.

The disc 4 on the output side is supported by the needle bearing 21 around the input shaft 20. The cylindrical output shaft 22 formed together with the disc 4 on the output side is supported by an angular ball bearing 24 inside the housing 23. On the other hand, the one end (right side end in FIG. 4) of the input shaft 20 is rotatively supported by a roller bearing 25, while the other end (left side end in FIG. 4) thereof is rotatively supported by an angular ball bearing 26 inside the housing 23 through a sleeve 27.

On the outer circumferential surface of the output shaft 22, a transmission gear 30, which is integrally formed by a forward gear 28 and a backward gear 29 on the driving side, is coupled by splines. When a vehicle advances, this transmission gear 30 travels to the right-hand side so that the forward gear 28 on the driving side and a forward gear 32 on the driven side arranged on the intermediate section of an outlet shaft 31 are allowed to engage with each other directly. When a vehicle is driven in reverse, the transmission gear 30 travels to the left-hand side so that the backward gear 29 on the driving side and a backward gear 33 on the driven side fixed to the intermediate section of the outlet shaft 31 are allowed to engage with each other through an intermediate gear (not shown).

When using a toroidal-type continuously variable transmission structured as described above, the input shaft 20 rotates by means of an engine through a clutch 38 to shift the transmission gear 30 in an appropriate direction. Then the outlet shaft 31 can be driven to rotate in an arbitrary direction. Also, each of the trunnions 6 and 6 is allowed to swing so as to change the contacting positions between the circumferential surfaces 8a, 8a of the power rollers 8, 8 and the inner side surfaces 2a, 4a of the discs 2, 4 on the input and output sides, respectively. Then it becomes possible to change the ratio of rotational speed between the input shaft 20 and the outlet shaft 31.

However, in case of the conventional toroidal-type continuously variable transmission structured to function as described above, the durability of the power rollers 8 and 8 is not necessarily perfect. The inventor hereof has, therefore, studied the causes of such imperfect durability, and found that one of them is the great tensile stresses caused by thrust loads which are exerted on the power rollers 8, 8 on the portions close to the outer edge faces 8b, 8b and the inner diameter of the power rollers 8 and 8.

In other words, the inner circumferential surface of the power roller 8 incorporated in the conventional toroidal-type continuously variable transmission is just a cylindrical surface whose diameter does not change in the axial direction as shown in detail in FIG. 5. On the other hand, when the toroidal-type continuously variable transmission is in operation, large thrust loads are applied to the power roller 8 in order to secure a sufficient efficiency of power transmission by pressing the inner circumferential surface 8a thereof with the inner side faces 2a, 4a (FIG. 2 to FIG. 4) of the discs 2, 4 on the input and output sides.

Also, in general, the contacting portions α, α between the circumferential surfaces 8a, 8a, and the inner side faces 2a, 4a are farther outside, in the diametral direction, than the contacting portions β, β between the rolling surfaces of the rolling elements 12, 12 constituting the thrust rolling bearing 9, and the outer ring raceway 10 of the outer edge surface 8b of the power roller 8. The aforesaid thrust loads act in the directions indicated by arrows A, A in FIG. 5 as a force sectionally twisting the power roller 8 with the aforesaid contacting portions α, α as acting points and the contacting portions β, β as fulcra. As a result, tensile stresses act on the portions X, X in FIG. 5 which are close to the outer edge surface 8b and the inner diameter of the power roller 8.

Then, due to the repeated tensile stresses occurring during use for a long time, there tend to occur cracks and other damage in the portions X and X. In this respect, the tensile stresses are also exerted due to the fact that each power roller 8 is strongly pinched between the inner side faces 2a, 4a of the discs 2, 4 on the input and output sides. In other words, the power roller 8 which is strongly pinched between the inner side faces 2a and 4a is elastically deformed to be oval, but along with this elastic deformation, the tensile stresses and compression stresses are alternately exerted on the inner circumferential edge portion of the power roller 8.

In the meantime, there is disclosed, as shown in FIG. 6, a structure in Japanese Patent Laid-Open Application No. 58-128555 wherein the inner diameter of the center hole of a power roller 8 is made larger in a portion close to the outer edge surface, and the power roller 8 is supported by this portion. In this structure, the diameter of the thrust rolling bearing 9 is made larger in order to support the thrust loads exerted on the power roller 8. Therefore, the diametral deviation is smaller between the point at which the thrust rolling bearing 9 supports the thrust loads, and the point at which the thrust loads are applied to the power roller 8 from each of the discs 2 and 4 (FIG. 2 to FIG. 4) on the input and output sides. Conceivably, there is almost no danger, therefore, that the damage described above is caused to occur on the power roller 8.

However, making the diameter of the thrust rolling bearing 9 larger as shown in FIG. 6 obviously leads to a large toroidal-type continuously variable transmission. In practice, therefore, the adoption of this approach is beyond consideration. Also, in this respect, if the diameter of the thrust rolling bearing 9 is made smaller with the structure shown in FIG. 6, it is obvious that the problem of damaging the power roller 8 still remains unsolved.

A toroidal-type continuously variable transmission of the present invention is designed in consideration of these circumstances described above.

SUMMARY OF THE INVENTION

It is an object of the present invention to prevent power rollers from being damaged by tensile stresses exerted when a toroidal-type continuously variable transmission is in operation.

A toroidal-type continuously variable transmission of the present invention comprises, as in the conventionally known toroidal-type continuously variable transmission described above, a disc on the input side and a disc on the output side, which are coaxially arranged with each other; the trunnions which can swing centering on the pivots torsionally positioned with respect to the central axes of both discs; the displacement shafts whose leading ends extend from the inner side faces of the trunnions; the power rollers which are rotatively supported around the leading ends of the displacement shafts through needle bearings, and pinched between the discs on the input and output sides, respectively; and the thrust rolling bearings each provided between the outer end faces of the power rollers and the inner side faces of the trunnions, respectively. Then the inner side faces of the discs on the input and output sides, which face each other, are made concave sectionally to form a circle, while the circumferential surface of each power roller is made convex to be spherical, thus allowing each circumferential surface and a corresponding inner side face to be in contact with each other.

Particularly, in accordance with a toroidal-type continuously variable transmission of the present invention, there are formed on the aforesaid inner circumferential surface of each power roller a smaller diametral section close to the aforesaid outer edge surface; a larger diametral section close to the inner edge surface; and a stepping portion connecting the smaller and larger diametral sections. Then, the aforesaid needle bearing is provided between the inner circumferential surface of the larger diametral section, and the outer circumferential surface of the aforesaid displacement shaft.

In this respect, the action itself of the toroidal-type continuously variable transmission of the present invention structured as described above is the same as that of the aforesaid conventionally structured transmission in performing the changes of the ratio of rotational speed between the input and output shafts 1 and 3.

Particularly, in the toroidal-type continuously variable transmission of the present invention, it is possible to make the distance smaller between the inner circumferential surface of the smaller diametral section, and the outer circumferential surface of the displacement shaft to the extent that there is provided with respect to the displacement shaft a needle bearing to support the power roller between the outer circumferential surface of this displacement shaft and the inner circumferential surface of the larger diametral section. Then, by the portion of this smaller diametral section, the stress volume is increased in the portion close to the outer edge surface and the inner diameter, where great tensile stresses are exerted when the toroidal-type continuously variable transmission is in operation. As a result, damage such as cracks can hardly take place in this portion even when great tensile stresses are exerted on the portion close to the outer edge surface and the inner diameter during the operation of the toroidal-type continuously variable transmission.

DETAILED DESCRIPTION OF THE PREFERRED EMBODIMENTS

Figure 1:
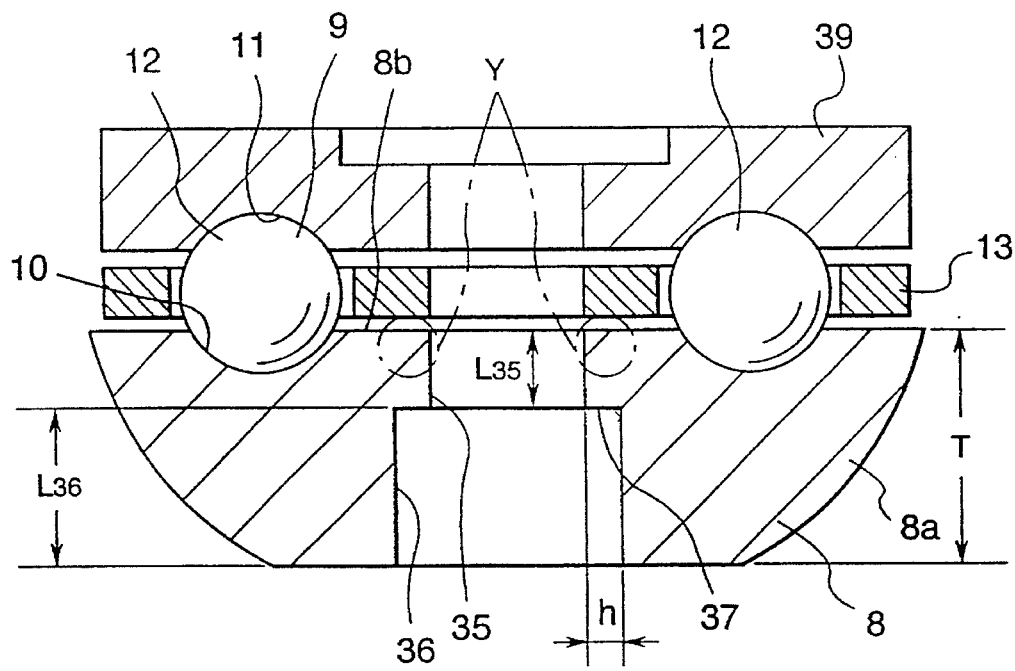
FIG. 1 is a view which shows a first embodiment in accordance with the present invention, and is a cross-sectional view showing the power roller and thrust rolling bearing.
Figure 2:
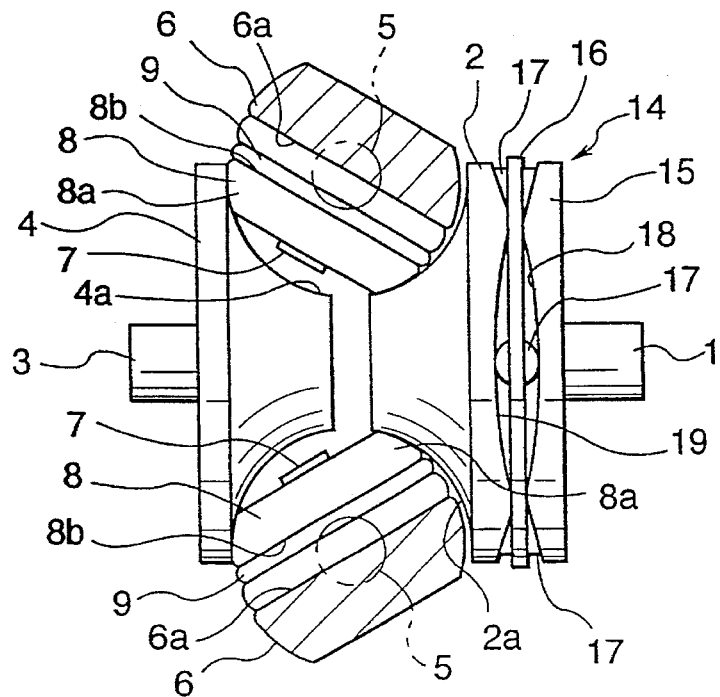
FIG. 2 is a side view which shows the fundamental structure of a conventionally known toroidal-type continuously variable transmission in a state of being reduced to the lowest speed.
Figure 3:
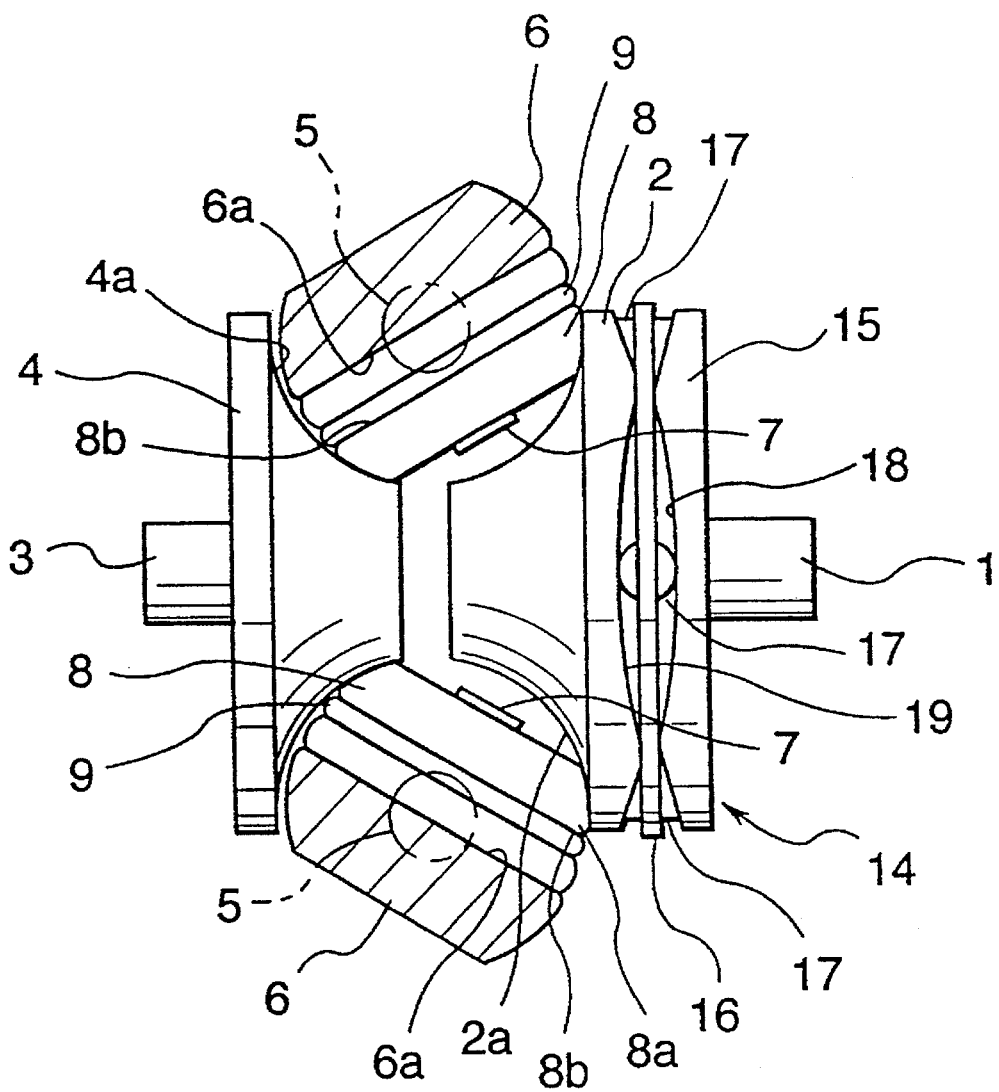
FIG. 3 is a side view which shows the fundamental structure of a conventionally known toroidal-type continuously variable transmission in a state of being accelerated to the maximum.
Figure 4:
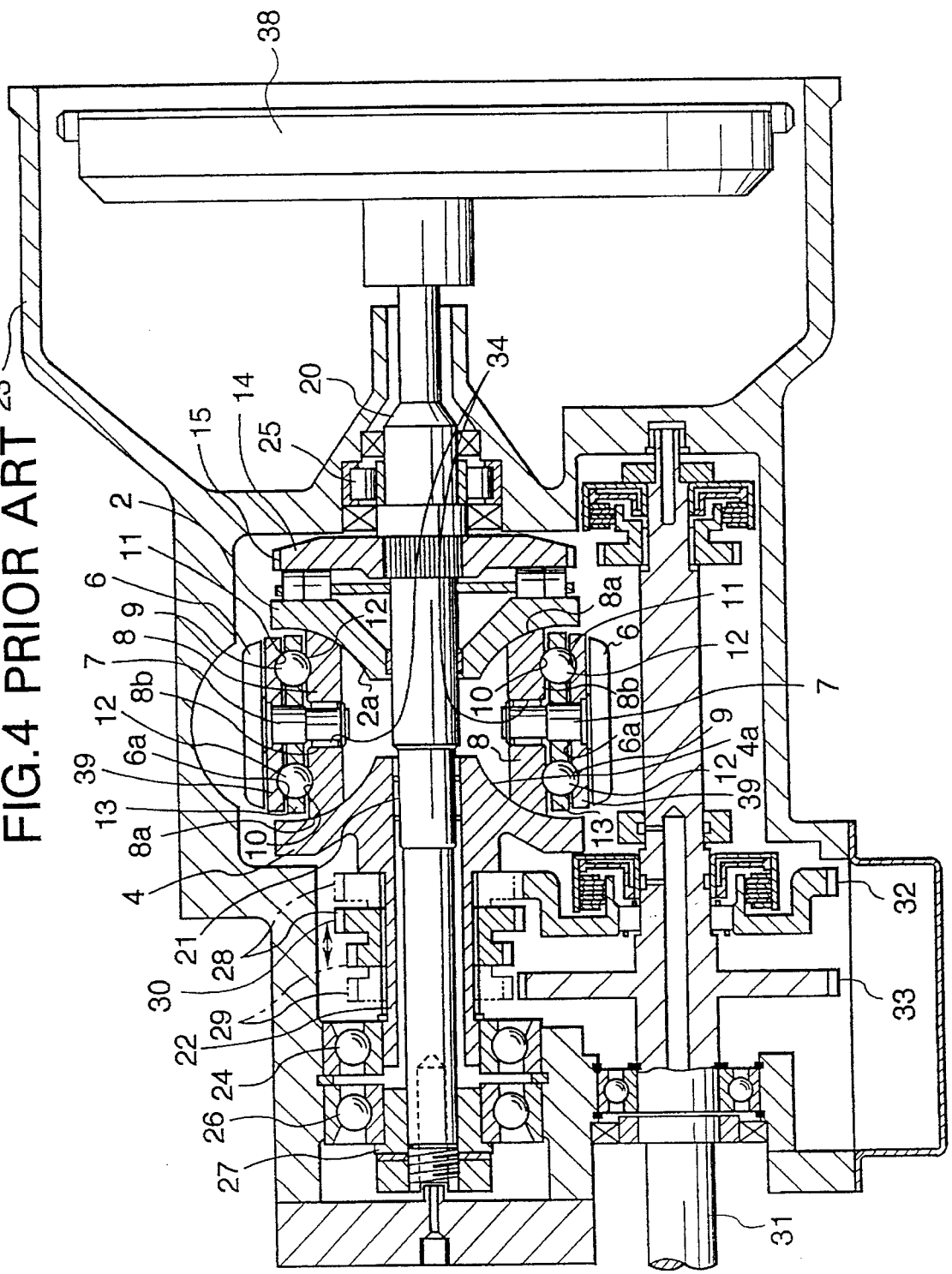
FIG. 4 is a view which shows one specific example of the conventional structure.

FIG. 1 is a view which shows a first embodiment. Here, the features of the present invention are that the configuration of the inner circumferential surface of each power roller 8 is devised to mitigate the stresses to be exerted on the power roller 8 so that the durability of the power roller 8 can be enhanced. The structures and functions of the other portions are the same as those of the conventionally known toroidal-type continuously variable transmission represented in FIG. 2 to FIG. 4, for example. Therefore, any repeated description thereof will be omitted. Hereinafter, the description will be made centering on the features and advantages of the present invention.

On the inner circumferential surface of each power roller 8 constituting a toroidal-type continuously variable transmission in accordance with the present invention, there are formed a smaller diametral section 35 (close to the upper side in FIG. 1) which is close to the outer edge surface 8b of the power roller 8; a larger diametral section 36 (close to the lower side in FIG. 1) which is close to the inner edge surface; and a stepped portion 37 connecting the smaller and larger diametral sections 35 and 36. Then the needle bearing 34 (FIG. 4) which supports the power roller 8 around the leading end of the displacement shaft 7 is provided between the inner circumferential surface of the larger diametrical section 36 and the outer circumferential surface of the displacement shaft 7. Therefore, it is necessary to set the axial length $L_{36}$ of this larger diametral section 36 to be more than ½ of the thickness dimension T of the power roller 8 or preferably, ⅔ or more.

In this respect, it is preferable to chamfer a curve whose section is a quarter circle or the like on both diametral ends of the stepped portion, and the connecting portion between the smaller and larger diametral sections, respectively. This chamfering process is needed in order to prevent damage such as cracks from occurring on the connecting portions by the concentrated stresses being exerted thereon.

Figure 5:
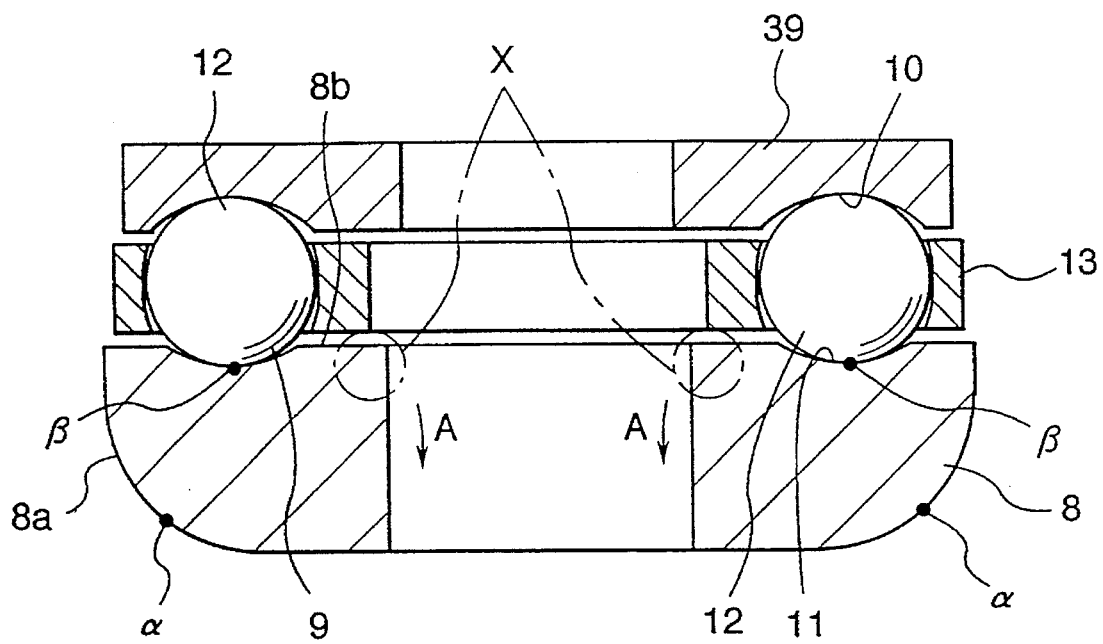
FIG. 5 is a view which shows a first example of the conventional structure, and is the same cross-sectional view as FIG. 1.
Figure 6:
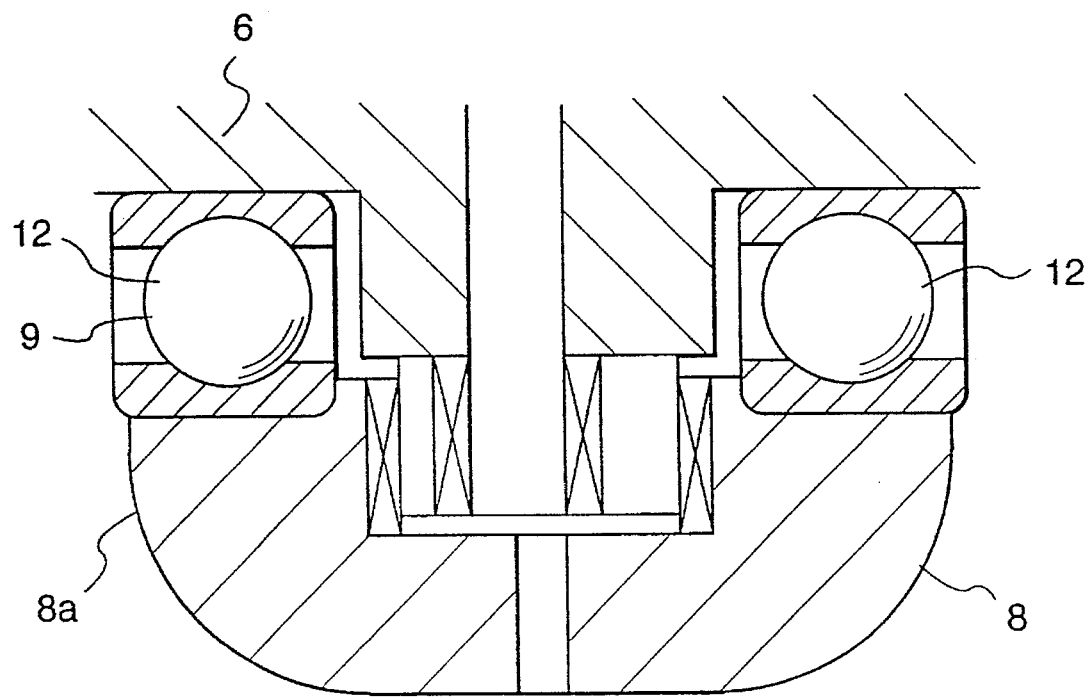
FIG. 6 is a view which shows a second example of the conventional structure, and is the same cross-sectional view as FIG. 1.

In the toroidal-type continuously variable transmission of the present invention which is structured by incorporating each of the power rollers 8 arranged as described above, it is possible to make the distance smaller between the inner circumferential surface of the smaller diametral section 35, and the outer circumferential surface of the displacement shaft 7 to the extent that there is provided, with respect to the displacement shaft 7, the needle bearing 34 to support the power roller 8 between the outer circumferential surface of the displacement shaft 7, and the inner circumferential surface of the larger diametral section 36. In other words, the inner diameter of the smaller diametral section 35 can be made smaller than the inner diameter of the power roller (see FIG. 5) incorporated in the conventional toroidal-type continuously variable transmission by the dimension of a height h of the aforesaid stepping portion 37. That is, the sectional area of the aforesaid power roller 8 can be made larger in a portion close to the inner edge surface 8b inside the diametral direction by an amount equivalent to the product $(h \cdot L_{35})$ of the height h multiplied by the axial length $L_{35}$ of the smaller diametral section 35.

Then, with the increased sectional area of the power roller 8 by the presence of a smaller diametral section 35, the stress volume is increased in the portion (at Y, Y in FIG. 1) close to the outer edge surface and the inner diameter of the power roller 8, where great tensile stresses are exerted when a toroidal-type continuously variable transmission is in operation. As a result, even when great tensile stresses are exerted on the portion close to the outer edge surface and the inner diameter during the operation of the toroidal-type continuously variable transmission, damage such as cracks can hardly be created on such portion.

Since the toroidal-type continuously variable transmission of the present invention is structured to function as described above, it is possible to implement the prevention of each power roller from being damaged by the application of tensile stresses, and also, enhance the reliability and durability of the toroidal-type continuously variable transmission. Also, it is possible to make the thrust loads applicable to each power roller greater. Therefore, the contact pressure can be increased between the circumferential surface of each power roller and the inner side faces of both discs on the input and output sides, thus providing the enhanced efficiency of the toroidal-type continuously variable transmission.

What is claimed is:

1. A toroidal-type continuously variable transmission, comprising:

- a disc on an input side and a disc on an output side, which are arranged coaxially with each other and have inner side faces opposed to each other, each of said inner side faces having a cross-section substantially in the shape of a circular arc;
- a trunnion swingable around an axis transverse to respective central axes of said discs;
- a displacement shaft having a leading end extending from an inner side face of said trunnion;
- a power roller rotatably supported around said leading end of said displacement shaft through a needle bearing, and disposed between said discs on the input and output sides, a peripheral surface of said power roller being substantially in the shape of a portion of a sphere and being in contact with said inner side faces of said discs on the input and output sides; and
- a thrust rolling bearing provided between an outer end surface of said power roller and said inner side face of said trunnion, wherein an inner circumferential surface of said power roller has a smaller diametral section closer to said outer end surface, a larger diametral section closer to an inner end surface of said power roller, and a stepping portion connecting said smaller and larger diametral sections, and said needle bearing is provided between said larger diametral section of said inner circumferential surface of said power roller and an outer circumferential surface of said displacement shaft.

* * * * *